(12) United States Patent
Mac et al.

(10) Patent No.: US 11,448,661 B2
(45) Date of Patent: Sep. 20, 2022

(54) COAXIAL ANGULAR VELOCITY SENSOR SYSTEM

(71) Applicant: VIETTEL GROUP, Ha Noi (VN)

(72) Inventors: Luu Phong Mac, Hai Duong province (VN); Van Tam Nguyen, Thanh Hoa province (VN); Duc Bang Duong, Vinh Phuc province (VN); Van Tien Pham, Hai Duong (VN)

(73) Assignee: VIETTEL GROUP, Ha Noi (VN)

( * ) Notice: Subject to any disclaimer, the term of this patent is extended or adjusted under 35 U.S.C. 154(b) by 436 days.

(21) Appl. No.: 16/732,896

(22) Filed: Jan. 2, 2020

(65) Prior Publication Data
US 2020/0217871 A1    Jul. 9, 2020

(30) Foreign Application Priority Data
Jan. 3, 2019  (VN) ............................... 1-2019-00036

(51) Int. Cl.
*G01P 3/48* (2006.01)
*G01P 3/489* (2006.01)
*G01P 15/14* (2013.01)

(52) U.S. Cl.
CPC ............ *G01P 3/4802* (2013.01); *G01P 3/489* (2013.01); *G01P 15/14* (2013.01)

(58) Field of Classification Search
CPC ......... G01P 15/14; G01P 3/4802; G01P 3/489
See application file for complete search history.

(56) References Cited

U.S. PATENT DOCUMENTS

| | | | | |
|---|---|---|---|---|
| 5,559,291 A * | 9/1996 | Hasegawa | ............. | G01C 19/56 73/504.12 |
| 6,298,723 B1 * | 10/2001 | Konno | ............... | G01C 19/5607 73/504.16 |
| 9,702,349 B2 * | 7/2017 | Anderson | ............ | B60G 17/052 |

* cited by examiner

*Primary Examiner* — Elias Desta
(74) *Attorney, Agent, or Firm* — Patenttm.US

(57) ABSTRACT

The Coaxial Angular Velocity Sensor System is an electronic sensor, which processes and supplies the output signal of the inertial angular velocity with high accuracy and great reliability. The device consists of the main components: angular velocity sensor, analog-digital converter, microcontroller, temperature sensor, power source, mechanical anti-noise-proof chassis. The device's microprocessor comes with a signal processing algorithm that helps increase the accuracy of the device's output. Because of its compact size, high precision, and low cost, the device is used in high precision devices such as UAV cameras, or in life applications such as self-balancing vehicles.

15 Claims, 2 Drawing Sheets

COAXIAL ANGULAR VELOCITY SENSOR SYSTEM

TECHNICAL FIELD

The invention refers to the coaxial angular velocity sensor system with high accuracy, low error. Specifically, the content mentioned in the invention describes the hardware module design, signal processing algorithm and application features of the sensor module to control the operation of a Gimbal carrying the camera or other products belonging to electronic, embedded programming and automation fields.

BACKGROUND OF THE INVENTION

In the published patent documents, some works have content concerning angular velocity (Gyroscope). Some shortcomings and limitations of published inventions remain as follows:

United States Published Patent Application No. 20070068251 A1 on Mar. 29, 2007, describes a design of a gyroscope sensor using vibration bars and the application of the Coriolis force to measure the angular velocity around the sensor's axis. The contents of the invention mainly represent the structure of vibration and electric element in the design of the gyroscope. However, the method of increasing the accuracy of the sensor has never been mentioned, to increase the accuracy of this sensor, it must be accompanied by an improvement in materials and manufacturing technology, requiring the complexity requirement and very high cost.

U.S. Pat. No. 9,170,105 B1 on Oct. 27, 2015, describes system design and method of improving the accuracy of the gyroscope sensor. The contents of the invention mainly cover the combination and arrangement of multiple sensors to minimize common noise, using the Kalman filter to reduce sensor bias. However, the proposed solution does not address processor hardware design issues, and how to reduce ARW noise (Angular Random Walk) to increase the accuracy in long-time applications.

To overcome these limitations, the present invention proposes to make a hardware module with combined numerous gyroscopes in one axis to increase the sensor output which provides differences from any published patent.

BRIEF SUMMARY OF THE INVENTION

The purpose of the present invention is to manufacture the Coaxial Angular Velocity Sensor System, namely as a hardware module with multiple gyroscopes placed coaxial and in the same plane to reduce error of any single gyroscope; combined with the signal processing algorithm of the sensor set also help the output of the sensor module reduce high-frequency interference, angular drift, and some other parameters. Especially on the angular velocity sensor module, there is also a sensor for measuring the temperature, which greatly is a reference with the sensitivity and accuracy of the gyroscope. The sensor module requires fast signal processing time, the minimum output frequency of 1 KHz to serve the control of systems whose input is angular velocity data after processing. Besides, the device is a compact design that can be easily paired with embedded boards and helps save energy.

To achieve the above goal, the authors propose the invention of a hardware gyroscope circuit combined with a signal processing software algorithm.

According to the invention, the Coaxial Angular Velocity Sensor System consists of the gyroscope hardware circuit with two layers: top-bottom and protected by a mechanical cover.

The top layer includes gyroscopes, analog to digital converter (ADC), a low pass filter circuit, connectors; the bottom layer includes a microcontroller, power source, temperature sensor circuit. To be more precise, each circuit has separate points:

Gyroscopes made by N gyroscope sensors are arranged on the same symmetric layer, staggered according to the equilateral N shape;

analog to digital converter (ADC) with SAR (successive approximation register) structure arranged in the space between the sensors;

a microcontroller is connected to peripheral devices by connectors, which contains the Kalman Observer to filter sensor input data and provide high precision angular velocity results for the system;

the power source is an electronic element arranged in the top layer, near the input source connector; ensured to be at least 10 mm away from high-speed element and sensor signal to avoid the heat from radiating source to affect signal processing parts;

the low pass filter circuit is a passive filter consisting of two passive components, which are resistors and capacitors with cutoff frequency calculated satisfactorily: $f_c=(4 \div 5) \cdot f$ where $f_c$ is cutoff frequency, f is sampling rate of the analog to digital converter (ADC) circuit;

$$f_c = \left| \frac{1}{2\pi RC} \right|,$$

R is resistor value (Ohm), C is capacitor value (F);

the temperature sensor is an element that measures temperature value of gyroscopes circuit, the value collected by a microcontroller, acting as reference value correcting the sensor parameter;

the Connector has 6 pins, that are used to connect with power supply for active sensor and connect to the buses which provide transmission of information from a microcontroller to peripheral devices.

In addition, according to an implementation of the invention, the Coaxial Angular Velocity Sensor System also includes power indicator of any color LED, indicating the status of the circuit when connected to the input power source, it is arranged in an easy to see location and with no effect to arrangement of other elements, regularly located at the top layer of the module.

In addition, according to an implementation of the invention, the number of the gyroscopes in the circuit is an even number and greater than or equal than 8.

In addition, according to an implementation of the invention, it is best to use 8 gyroscope sensors, divided into two groups, group 1 placed on the edge of the octagon, group 2 placed on straight lines parallel to the other side of the octagon, translating to a distance of 5-7 mm.

In addition, according to an implementation of the invention, the Coaxial Angular Velocity Sensor System is covered in an anti-electromagnetic mechanical housing made of aluminum, the fan shape design covers the entire hardware module, there are convenient connectors and port for manipulating the installation and assembly of equipment.

In addition, according to an implementation of the invention, it is better if the microcontroller uses a 32-bit register and the Arithmetic Logic Unit (ALU) is both 32 bit or especially ARM Cortex M7 series.

In addition, according to an implementation of the invention, it is better if the analog to digital converter (ADC) circuits have ≥14 bit resolution, and the number of analog channels is greater than or equal 8.

A DETAILED DESCRIPTION OF THE INVENTION

Figure 1:
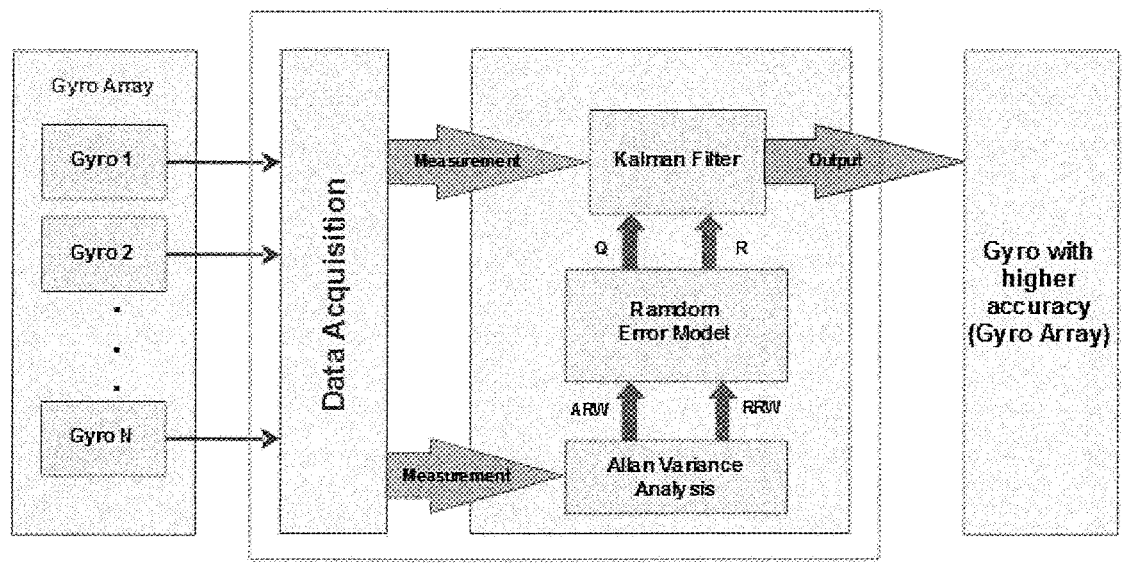
FIG. 1: Signal processing algorithm diagram.
Figure 2:
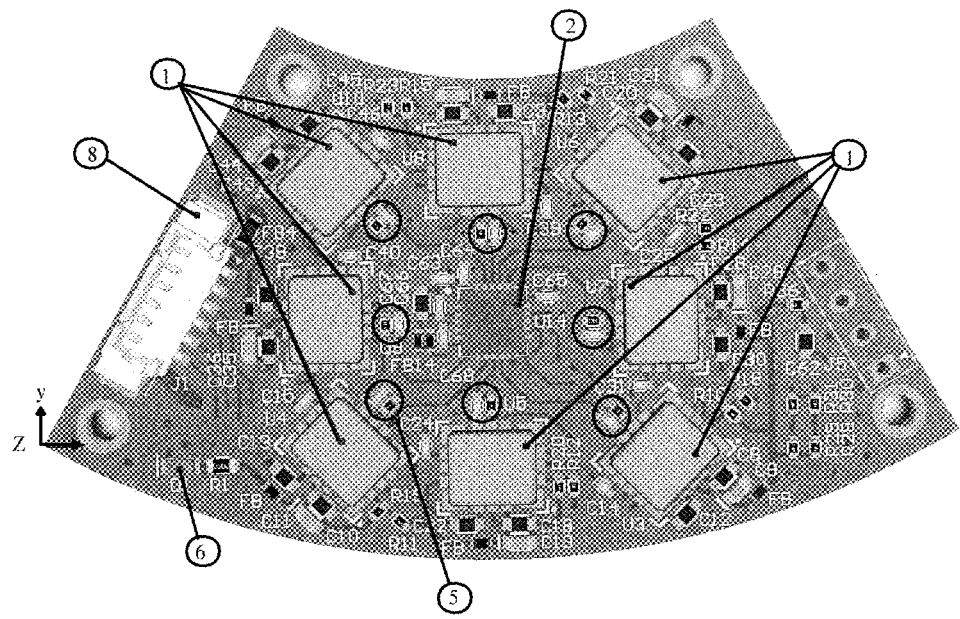
FIG. 2: Top layer of the sensor module.
Figure 3:
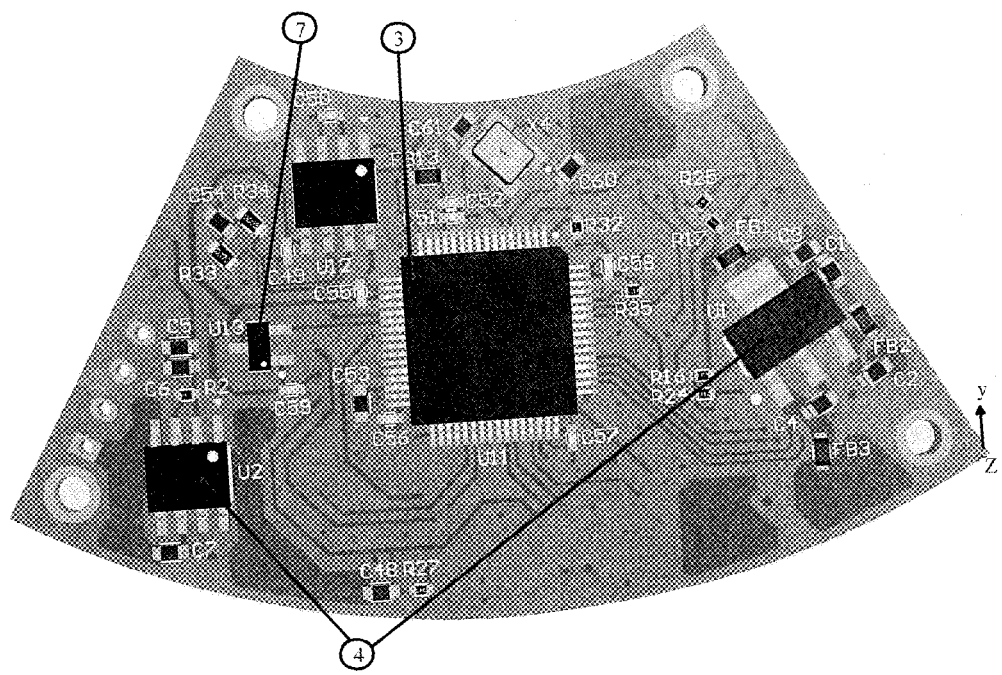
FIG. 3: Bottom layer of the sensor module.

The Coaxial Angular Velocity Sensor System mentioned in the present invention is the hardware of the sensor module, in which this hardware is a fan shape sensor board with two layers: top and bottom.

The top layer includes: gyroscope 1, analog to digital converter 2, the low pass filter circuit 5, led power 6, Connecters 8. In particular:

gyroscope 1 is a sensor that measures angular velocity in one axis, the output signal is an analog signal, the bias drift of sensor ~12°/h, belonging to the MEMS gyroscope group based on Coriolis effect.

The output of the Coaxial Angular Velocity Sensor System after using Kalman Filter has Standard Deviation determined by the formula (calculated for the case of using N sensors):

$$\sigma_w^2 \approx (\sigma_{y1}^2 + \sigma_{y2}^2 + \ldots \sigma_{yN}^2)/N^2$$

By using N similar sensors, we assume that the Standard Deviation of each sensor is the same ($\approx \sigma_y$). Instead of the Standard Deviation formula above we get $\sigma_w^2 \approx \sigma_y^2/N$. Therefore, the minimum number of sensors to use to reach the desired angular velocity error is satisfying:

$$N = \left| \text{round}\left(\frac{Error_{cb}}{Error_{mm}}\right)^2 \right|$$

Where $Error_{mm}$ is the desired angular velocity error of the Coaxial Angular Velocity Sensor System, $Error_{cb}$ is the error of a single sensor, N is the minimum number of sensors.

Particularly, with the desired angular velocity error is 0.071 deg/√h, angular velocity error of a single sensor is 0.2 deg/√h, we have the minimum number of the sensors is:

$$N = \left| \text{round}\left(\frac{0.2}{0.071}\right)^2 \right| = 8 \text{ sensors}.$$

With the optimal requirement of the layout area and minimizing the electromagnetic interaction between the sensors as well as increasing sensitivity of the sensor module, authors propose a layout method as below:

eight gyroscopes are arranged in an octagonal and same plane with the analog to digital converter ADC (in Top layer), device in two groups: each group has four gyroscopes arranged in an alternate. Group 1 placed on the edge of the octagon, group 2 placed on straight lines parallel to the other side of the octagon, translating to a distance of 6 mm.

In the general case using N gyroscopes, the sensors are arranged on the same symmetric layer, staggered in an equilateral N shape; the number of sensors in addition to making sure to choose according to the requirements of the desired error, it is recommended to select the number of sensors as an even number to ensure the sensor arrangement has a reasonable and uniform coordination.

The component sensors are arranged in appropriate positions to avoid electromagnetic interference to each other, and the arrangement of the sensors ensures low attenuation analog signal, avoiding sawtooth pulse, environmental noise.

Middle space of gyroscopes 1 is used to layout the analog to digital converter ADC 2;

analog to digital converter ADC 2 is an electric component that converts the analog signal from gyroscopes 1 to a digital signal, has a Successive Approximation Register (SAR) structure and is declared located in the central space between gyroscopes (1). Analog to digital converter ADC must satisfy the number of analog input channels ≥8 (8 is the number of a gyroscope).

In addition, according to an implementation of the invention, with the desired measurement range is ±75°/s, the resolution is 0.015°/s so analog to digital converter ADC need $$\text{resolution} \geq \left| \text{round}\left(\log_2\left(\frac{150}{0.015}\right)\right) \right| = 14 \text{ bit}.$$

That is a requirement about the number of channels and resolution of the analog to digital converter ADC.

In addition, according to an implementation of the invention, it is better if we use analog to digital converter ADC with 16-bit resolution, 500KSPS, 8 analog input channels.

Low pass filter circuit 5 is a passive filter consisting of two passive components, which are resistors and capacitors, filtered analog signals from gyroscopes and is input for analog to digital converter ADC 2. Cutoff frequency calculated satisfactorily: $f_c=(4 \div 5) \cdot f$ where $f_c$ is cutoff frequency, f is sampling rate of the analog to digital converter (ADC) circuit;

$$f_c = \left| \frac{1}{2\pi RC} \right|,$$

R is resistor value (Ohm), C is capacitor value (F);

In addition, according to an implementation of the invention, the Coaxial Angular Velocity Sensor System also includes a power indicator of any color LED 6, indicating the status of the circuit when connected to the input power source, it is arranged in an easy to see location and has no effect to arrangement of other elements, regularly located at the top layer of the module.

The Bottom layer includes: microcontroller 3, power source 4, the temperature sensor 7. In particular:

Microcontroller 3 is the central element of the module, collecting the angular velocity value of the sensors, implementing an algorithm to process the collected data. The selected microcontroller satisfies the computational speed requirements and communication standards.

In addition, according to an implementation of the invention, a 32-bit microcontroller (ARM Cortex) with reduced instructions set computer structure, register and Arithmetic Logic Unit (ALU) are both 32 bit. In addition to the ARM Cortex M7 series selected to ensure processing speed, it is also possible to choose DSP lines specializing for signal processing as the core of the system.

Refer to FIG. 1 for a description of the module's signal processing algorithm and filter measurement noise. The microcontroller uses the Kalman Observer to filter the sensor input signal and produce high precision angular velocity for the system.

Power source 4 is electric components designed to create voltages supply for other electrical components on the board; selected to meet the accuracy and allow voltage drop of the other electric elements on the board. The power source is in a layout on the top layer of the module, near the input power source; ensures a minimum distance from the high-speed elements and sensor signal of at least 10 mm to avoid the heat from the power source.

Temperature sensor 7 used to measure the temperature value of the sensor board, the value collected by microcontroller-3, which serves as the reference value to adjust the sensor parameters-1. The Allan Variance graph of gyroscope-1 difference on each temperature range. This graph of gyroscopes-1 is pre-measured on each temperature from 10° C. to 80° C. (with step 5° C.). Kalman filter parameters will be adaptive based on temperature value and the Allan Variance of gyroscope-1 to improve the quality of the filter.

Connector 8 has 6 pins, that acts as the connection with power supply for active sensor and connects to the buses which transmission information from microcontroller 3 to peripherals.

Figure 4:
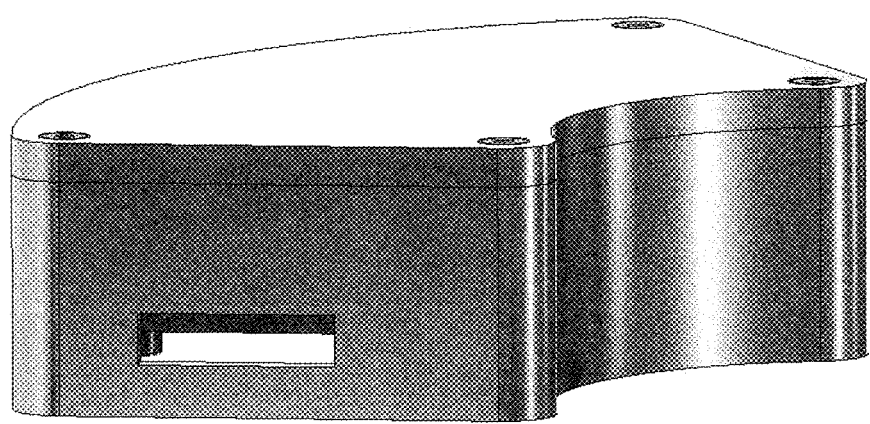
FIG. 4: Anti electric-magnetic field casing.

The entire system includes a gyroscope, microcontroller, connector . . . protected by aluminum mechanical housing, guaranteeing the connection and protection of the module from environmental impacts such as temperature, humidity, simultaneously, the mechanical casing also works against electromagnetic interference, that helps reduce the noise of collection and processing signal. The connectors conveniently manipulate the installation and assembly of equipment. Refer to FIG. 4, the aluminum mechanical case, fan shape, full cover hardware module, which protects module as well as creating a Faraday cage, Anti-electromagnetic interference based on properties: The electric field inside the conductor surface is zero, so if the outside is charged, the inside of the Faraday cage will not be charged with electric and magnetic fields, thus preventing electromagnetic interference caused to the internal hardware board.

The output of the sensor is an analog signal, so as to avoid being affected by digital signals, power source and avoid signal attenuation, the sensors and the analog to digital converter are arranged on the same layer; Besides, the low-pass filter circuit is arranged between the sensor output and the input of the analog-to-digital converter to ensure that the signal lag from the sensor to the analog-to-digital converter between the sensors is trivial. The remaining elements such as power source, microcontroller, temperature sensor are placed on the remaining layer.

The interaction between the components in the device is started when supplying 5V DC power to the system, power supply block 4 has the function of ensuring a stable 3.3V power supply for the entire operating system. After the 3.3V source is stable, the 6-indicator LED lights the system to start working, then the system operates on a closed-loop in sequence: the sensors measure 1 and give the same voltage value corresponding to angular velocity value, this voltage value after being filtered by the low pass filter 5 eliminates the high-frequency disturbance signals that will be converted into the microcontroller by the block 2 through the SPI interface; At the same time when powered, the temperature sensor block 7 also measured and gives the value of the direct input voltage conversion unit to the number inside microcontroller 3 to read about the temperature value; microcontroller 7, after collecting enough necessary input data, will conduct the signal processing algorithm and output the system.

EXAMPLE

The following refers to an example of the specifically coaxial angular velocity sensor system. The following example is for clarification purposes only and does not impose any restrictions on the proposed invention Specifically, the coaxial angular velocity sensor system uses eight CRM100 gyroscopes, the 32-bit STM32F722RET6 microcontroller, the 16 bit AD7699BCPZRL7 analog to digital converter, IC Voltage Reference REF196GSZ-REEL.

The gyroscope system tested with Angular random walk (ARW) and Bias instability (BI) values determined on the Allan Variance characteristic line decreased by 2.83 times compared to the ARW and BI values of an original sensor and had Bandwidth up to 40 Hz. The prototype of the sensor module is applied on a near-range drone camera control system (UAV), resulting in a balance error of 0.5 mRad in the frequency area below 5 Hz Also with the above device configuration, this module can also be equipped on mid-range unmanned aerial vehicle (UAV) cameras or equipped on self-propelled vehicles and balanced robots. The module is particularly effective and directed at applications that operate in severe vibration environments and require high accuracy.

EFFECTIVENESS

The invention uses Arm Cortex M7 microcontroller with fast processing speed, supports digital signal processing functions (DSP, FFT), communicates and reads data from high-speed peripheral to ensure frequency of processing sensor signals of at least 1 KHz, in addition the sensor circuit also has an IC to convert analog to digital signals with 16 bit resolution, ensures small measurement errors and the system can handle digital signals with high resolution. The output of the system is digital data transmitted via SPI or CAN standard, thus overcomes the error of data transmission compared to reading analog data directly. The device has a long service life, uses 5 VDC power, low energy consumption ($\approx$1 W).

The direct application of a coaxial angular velocity sensor system processing circuit is to make input data for control systems that use angular velocity values with inertial reference systems such as self-balancing vehicles and systems. Balancing mechanics, self-propelled robots, the system determines the road map.

The invention claimed is:
1. A coaxial angular velocity sensor system comprising:
a gyroscope hardware circuit with two layers: a top layer and a bottom layer and protected by a mechanical cover:
the top layer includes the gyroscope hardware circuit, an analog to digital converter (ADC), a low pass filter circuit, connectors;
the bottom layer includes a microcontroller, a power source, a temperature sensor circuit, wherein, the gyroscope hardware circuit comprises N gyroscope sensors that are arranged on a same symmetric layer, staggered according to an equilateral N shape;

the analog to digital converter (ADC) comprises a SAR (successive approximation register) structure arranged in a space between the N gyroscope sensors;

the microcontroller is connected to peripheral devices by the connectors, the microcontroller contains a Kalman Observer to filter sensor input data and provide high precision angular velocity results for the system;

the power source is an electronic element arranged in the top layer, near an input source connector; ensured to be at least 10 mm away from any high-speed element and a gyroscope sensor signal to avoid heat from a radiating source to affect signal processing;

the low pass filter circuit is a passive filter comprising two passive components, which are resistors and capacitors with a cutoff frequency calculated satisfying fc=(4/5)*f where f. is a cutoff frequency, f is a sampling rate the of the analog to digital converter (ADC) circuit; fc=1/2πRC, R is a resistor value; C is capacitor value;

the temperature sensor circuit is an element that measures temperature value of the gyroscope hardware circuit, a value collected by the microcontroller, acting as reference value correcting a sensor parameter;

the connector has 6 pins, that are used to connect with the power supply for active sensors and connect to buses which transmit information from the microcontroller to peripheral devices.

2. The coaxial angular velocity sensor system according to claim 1 including a power indicator of any color LED, indicating a status of the circuit when connected to the power source, the power indicator arranged in a visible location and has no effect to an arrangement of other elements, at the top layer of the gyroscope hardware circuit.

3. The coaxial angular velocity sensor system according to claim 2, wherein the system is covered in an anti-electromagnetic mechanical housing made of aluminum, having a fan shape design covering the entire coaxial angular velocity sensor system, wherein connectors and port are provided for manipulating the installation and assembly thereof.

4. The coaxial angular velocity sensor system according to claim 2, wherein the microcontroller uses a 32-bit register and an Arithmetic Logic Unit (ALU) is 32 bit.

5. The coaxial angular velocity sensor system according to claim 2, wherein the analog to digital converter (ADC) circuit has ≥a 14-bit resolution, a number of analog channels is greater than or equal to 8.

6. The coaxial angular velocity sensor system according to claim 2, wherein the microcontroller comprises an ARM Cortex M7 series.

7. The coaxial angular velocity sensor system according to claim 1, wherein the number of the gyroscope sensors in the gyroscope hardware circuit is an even number greater than or equal to 8.

8. The coaxial angular velocity sensor system according to claim 7, wherein the microcontroller uses a 32-bit register and an Arithmetic Logic Unit (ALU) is 32 bit.

9. The coaxial angular velocity sensor system according to claim 7, wherein the analog to digital converter (ADC) circuit has ≥a 14-bit resolution, a number of analog channels is greater than or equal to 8.

10. The coaxial angular velocity sensor system according to claim 7, wherein the microcontroller comprises an ARM Cortex M7 series.

11. The coaxial angular velocity sensor system according to claim 1, wherein 8 gyroscope sensors are used, divided into two groups, a group 1 and a group 2, group 1 placed on an edge of an octagon shape configuration, group 2 placed on straight lines parallel to an other side of the octagon shape configuration, translating to a distance of 5-7 mm between the gyroscope sensors.

12. The coaxial angular velocity sensor system according to claim 1, wherein the system is covered in an anti-electromagnetic mechanical housing made of aluminum, having a fan shape design covering the entire coaxial angular velocity sensor system, wherein connectors and port are provided for manipulating installation and assembly thereof.

13. The coaxial angular velocity sensor system according to claim 1, wherein the microcontroller uses a 32-bit register and an Arithmetic Logic Unit (ALU) is 32 bit.

14. The coaxial angular velocity sensor system according to claim 1, wherein the analog to digital converter (ADC) circuit has ≥a 14-bit resolution, a number of analog channels is greater than or equal 8.

15. The coaxial angular velocity sensor system according to claim 1, wherein the microcontroller comprises an ARM Cortex M7 series.

* * * * *